No. 844,472. PATENTED FEB. 19, 1907.
S. O. RICHARDSON, Jr.
APPARATUS FOR FIRE POLISHING GLASS ARTICLES.
APPLICATION FILED OCT. 30, 1906.
2 SHEETS—SHEET 1.
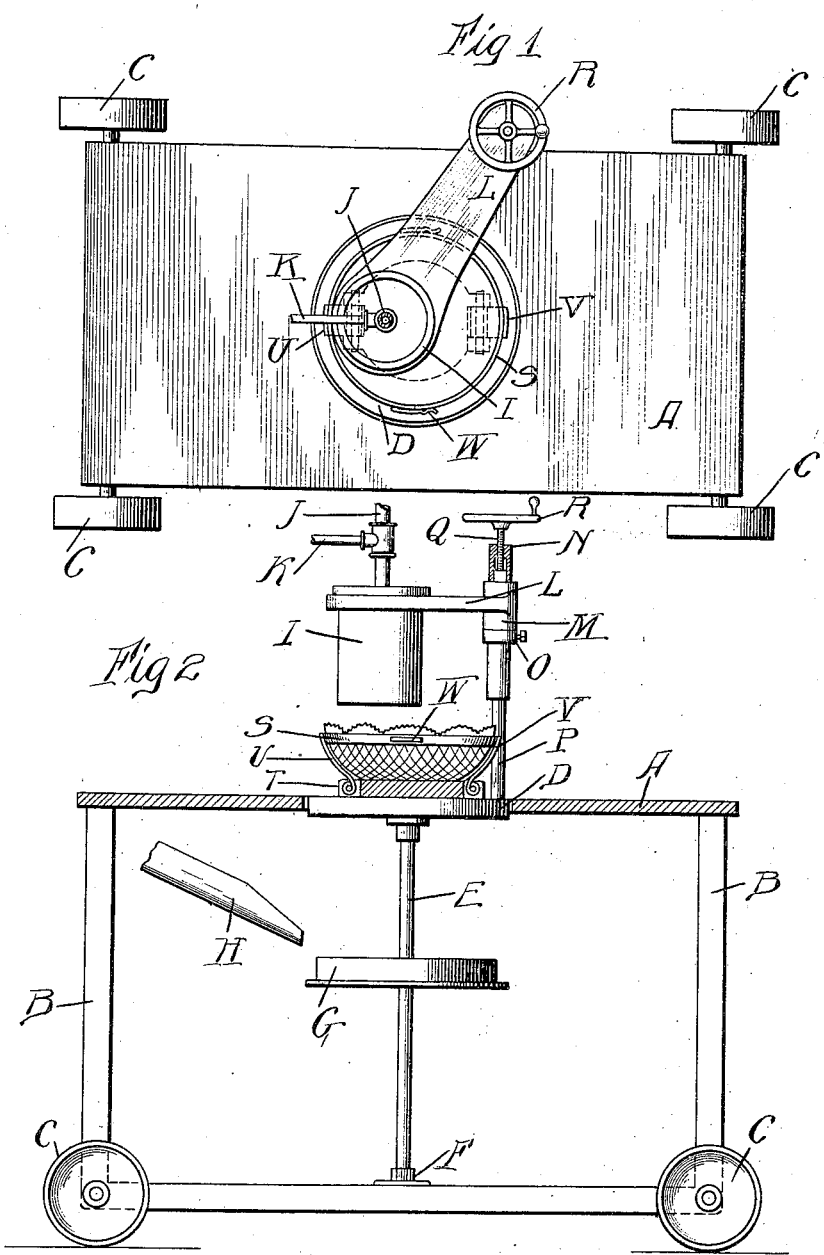
Witnesses:
Inventor:
Solon O. Richardson, Jr.
by Raymond & Barnett
Attys No. 844,472. PATENTED FEB. 19, 1907.
S. O. RICHARDSON, Jr.
APPARATUS FOR FIRE POLISHING GLASS ARTICLES.
APPLICATION FILED OCT. 30, 1906.
2 SHEETS—SHEET 2.
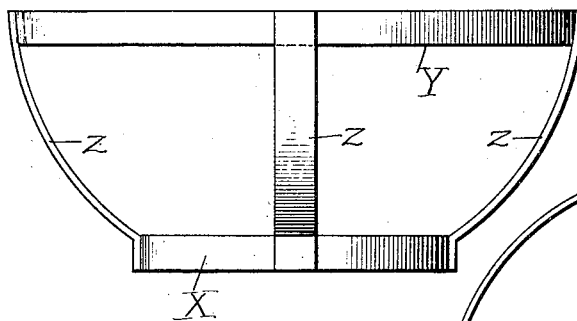
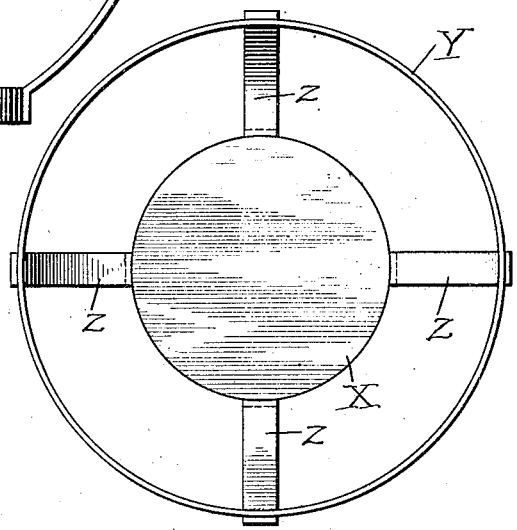
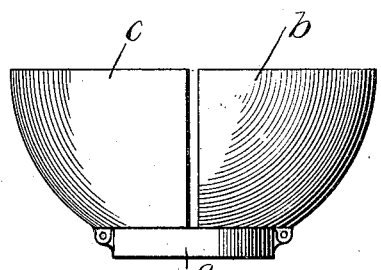
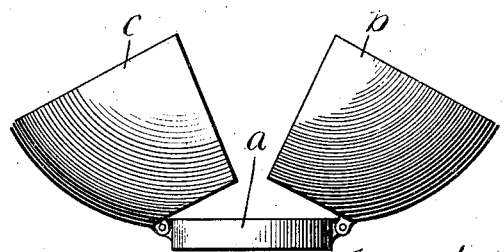

UNITED STATES PATENT OFFICE.

SOLON OSMOND RICHARDSON, JR., OF TOLEDO, OHIO.

APPARATUS FOR FIRE-POLISHING GLASS ARTICLES.

No. 844,472. Specification of Letters Patent. Patented Feb. 19, 1907.

Application filed October 30, 1906. Serial No. 341,266.

*To all whom it may concern:*

Be it known that I, SOLON OSMOND RICHARDSON, Jr., a citizen of the United States, residing at Toledo, in the county of Lucas and State of Ohio, have invented certain new and useful Improvements in Apparatus for Fire-Polishing Glass Articles, of which the following is a specification.

My invention relates to improvements in apparatus for fire-polishing glass articles.

The object of my invention is to provide an apparatus which is especially adapted to a process for fire-polishing glass articles, particularly pressed-glass articles and blanks for cut glass, by the use of which apparatus the work may be cheaply and rapidly done, while at the same time avoiding the possibility of chipping or otherwise marring the articles being polished and preventing the distortion of such articles under the influence of the heat applied thereto. This and such other objects as may hereinafter appear are accomplished by the use of the apparatus illustrated in the accompanying drawings, in which—

Figure 1 is a plan view of a convenient form of apparatus embodying my invention. Fig. 2 is an elevational view of the same. Fig. 3 is an elevational view of a support adapted to be used with this apparatus to hold the article to be polished while the same is being worked upon. Fig. 4 is a plan view of the same. Fig. 5 is a side elevational view of another style of support that may be employed, and Fig. 6 shows the same open to receive the article.

Like letters of reference indicate the same parts in the several figures of the drawings.

In the drawings, A indicates the top of a portable table or carriage, which is supported upon the legs B and provided with wheels or rollers C. Arranged within the top of the table A is a rotatable plate D, from which extends downward a spindle E, the latter being supported and adapted to rotate in a bearing F in the bottom of the apparatus.

The spindle E is adapted to be rotated by any suitable form of motor, and I have shown such a motor consisting of a wheel G, adapted to receive upon one of its sides an air-blast from a nozzle H. When a stream of air is directed from the nozzle upon the wheel G, the latter, the spindle E, and the plate D are caused to rotate at high speed.

I indicates a gas-burner, to which gas is supplied through a pipe J, and air to be mixed with the gas is supplied through the pipe K. The gas-burner I is carried upon an arm L, formed with a sleeve M, this sleeve M surrounding a sleeve N and being rotatable thereupon. A collar O supports the sleeve M upon the sleeve N. The sleeve N is mounted upon a standard P, which is provided with an adjusting-screw Q, which has a screw-threaded engagement with the sleeve N and which abuts against or rests upon the top of the standard P. The adjusting-screw Q is provided with hand-wheel R, by means of which it may be rotated when the sleeve N is to be adjusted up or down on the standard.

S is a form of support adapted to receive within itself the article to be polished and to be placed upon a rotating table D. A support, such as shown in Figs. 1 and 2, may consist of a base-block T, having hinged thereto the two separable halves U and V of a supporting-frame, these two halves being adapted to be locked together, as by a catch W, after the article to be polished has been placed therein or to be disengaged or swung apart on their hinges when it is desired to remove the article therefrom.

In Figs. 3 and 4 is shown a support which is not constructed in separable portions, this form of support or holder consisting of a base-block X, a ring Y, and connecting-strips or ribs Z, supporting the ring Y. The forms of holder shown in Figs. 1, 2, 3, and 4 are designed to support the articles to be polished only or mainly around their upper portions.

In Figs. 5 and 6 is shown a form of holder which is designed to give greater support to the article, being so constructed as to be in contact with practically the whole of the outside of the article. This form of holder may be required with those kinds of articles which are most likely to be softened and caused to sag under the influence of the heat and centrifugal force. This form of holder comprises a base a, having hingingly connected therewith the opposite halves b and c of a support which has substantially the same form interiorly as that of the sides of the article to be polished, excepting, of course, that the interior of the support will be smooth instead of having a design cut thereon.

I am aware that it is old to remove pressed articles from the mold and to support the same in solid formers while being subjected to a polishing-flame, but such process has always proved unsatisfactory for a pressed form or blank having a design pressed on the exterior thereof, because of the frequent chipping of the exterior of the design, which results from inserting it in and removing it from such a former; but by dividing the former and closing it upon the base-piece after the article to be polished has been set upon the base-piece this danger is eliminated. Furthermore, it has been found that while there is a tendency of a glass article to sag when the interior thereof is subjected to a fire-polishing heat unless some means are used to prevent this sagging such tendency ordinarily is not great, and a slight support will serve to overcome it. Consequently the form of support or former shown in Figs. 1 and 2 and that shown in Figs. 3 and 4, while affording sufficient support to overcome such relatively slight tendency to sag when the article is otherwise exposed to the open air, still permits of free radiation, not only because the body of the article is exposed to the atmosphere, but also because this form of support permits of its being made of light metal of high heat conductivity—such, for example, as copper—which, therefore, offers but slight obstruction to the free radiation of heat from the exterior of the glass article, and thereby avoids a sufficient of the body of the article to permit it to become objectionably plastic.

I believe it to be new with me to prevent the sagging of a glass article under the influence of a polishing heat applied to the exterior thereof by supporting the article in a support or former which opens and closes on the article, thereby avoiding injury to any pattern pressed on the exterior thereof, or to attain that result by supporting the article in a former or support which provides for a rapid radiation from the exterior thereof either because of the open construction of the support or because the support is constructed of thin metal having high heat conductivity.

In the use of my apparatus the glass article is placed within the support or holder and placed upon the revolving table D. A flame from the gas-burner I is then projected downward into the blank, the inner surface of which is quickly softened and melted sufficiently to obliterate all objectionable marks and defects and to give the glass the required high polish, whereupon the jet of flame is discontinued and the blank is removed and cooled in the usual manner.

Of course the shape of the former may be modified not only to fit different forms of articles, but to fit the interior of the article while applying a polishing heat to the exterior.

I claim—

1. An apparatus for fire-polishing glass articles, comprising a hinged, divided support adapted to be closed and secured upon such articles, and constructed to sufficiently conform to one surface of the articles to support the same against distortion when the opposite surface is subjected to a polishing-heat.

2. An apparatus for fire-polishing glass articles, comprising a rigid, open-work support sufficiently conformed to the exterior of the glass-blank to efficiently support the same while being polished, while at the same time providing free access of air to such blank during the polishing operation and means for projecting a polishing-flame against the interior of the glass-blank while so supported, whereby distortion of the blank by the heat of the polishing-flame is prevented.

3. An apparatus for fire-polishing glass articles, comprising a hinged, divided, open-work support arranged to be closed around the article to be polished to support the same so as to prevent distortion thereof when subjected to a polishing-flame, while at the same time affording free access of air thereto.

4. A device for supporting glass articles so as to prevent distortion when subjected to a polishing-flame, consisting of a thin, metallic ring arranged to surround such article so as to support the same against distortion, and means for supporting said ring in the desired position.

5. A support for glass articles to prevent distortion thereof while being subjected to a polishing-flame, consisting of an open framework of thin metal of good heat conductivity, formed to sufficiently conform to and support the highly-heated parts of a glass article when subjected to a polishing-flame to prevent such distortion and means for applying a polishing-flame to such articles at a point opposite to the contact of such support therewith.

6. An apparatus for fire-polishing glass articles, comprising a thin metal support sufficiently conformed to such article to support the same so as to prevent distortion thereof under the polishing heat, and means for projecting a polishing-flame against a surface of the article opposite to the surface so supported.

7. An apparatus for fire-polishing glass articles, comprising a separable support arranged to be opened to receive the article to be polished and to be closed upon said article, and constructed to sufficiently conform to said article to support the same so as to prevent distortion during the polishing operation, and means for projecting a polishing-flame into the article so supported so as to polish the interior thereof.

8. An apparatus for fire-polishing glass articles, comprising a rotatable base, an open-work support of thin metal conformed to one surface of such article and arranged to support the same so as to prevent distortion thereof under the polishing heat, means for projecting a polishing-flame against the opposite surface of said article, and means for simultaneously rotating said support, whereby there will be a free radiation from the side of said article opposite to the side being polished.

9. An apparatus for fire-polishing glass articles, comprising a thin metal ring arranged to receive and support the article during the polishing operation, and means for projecting a polishing-flame into the interior of the article while so supported and against the opposite side of the surface so supported.

10. An apparatus for fire-polishing glass articles, comprising means for projecting a polishing-flame against all of one side of a glass article, a thin, metallic support sufficiently conformed to the opposite side of said article to support the same and prevent distortion thereof during the polishing operation, and means for rotating said support while the polishing-flame is being applied, so that there shall be a free radiation of heat from the side of the glass article opposite to the side being polished.

11. An apparatus for fire-polishing glass articles, in combination with means for directing a polishing-flame against the entire inner surface of such articles, means for rotating the article while being polished, and means for so supporting said article during the polishing process as to prevent distortion thereof, said last-named means being so constructed as to permit free radiation therefrom.

SOLON OSMOND RICHARDSON, Jr.

Witnesses:
J. D. ROBINSON,
J. H. WRIGHT.